United States Patent
Yabre et al.

(10) Patent No.: US 9,052,480 B2
(45) Date of Patent: Jun. 9, 2015

(54) ALIGNMENT PIN AND OPTICAL COMMUNICATION SYSTEM

(75) Inventors: Gnitaboure Yabre, Mainvilliers (FR);
Nicolas Hermeline, Barjouvile (FR);
Yves Stricot, Villepreux (FR); Gert Droesbeke, Saint-Vit (FR)

(73) Assignee: FCI, Guyancourt (FR)

( * ) Notice: Subject to any disclaimer, the term of this patent is extended or adjusted under 35 U.S.C. 154(b) by 104 days.

(21) Appl. No.: 13/881,527

(22) PCT Filed: Oct. 25, 2011

(86) PCT No.: PCT/EP2011/068686
§ 371 (c)(1),
(2), (4) Date: Jul. 9, 2013

(87) PCT Pub. No.: WO2012/079819
PCT Pub. Date: Jun. 21, 2012

(65) Prior Publication Data
US 2014/0147084 A1    May 29, 2014

(30) Foreign Application Priority Data
Oct. 26, 2010    (WO) .................. PCT/IB2010/003036

(51) Int. Cl.
| | |
|---|---|
| *G02B 6/36* | (2006.01) |
| *G02B 6/42* | (2006.01) |
| *G02B 6/30* | (2006.01) |
| *G02B 6/38* | (2006.01) |

(52) U.S. Cl.
CPC ................ *G02B 6/4219* (2013.01); *G02B 6/30* (2013.01); *G02B 6/3885* (2013.01); *G02B 6/4214* (2013.01); *G02B 6/423* (2013.01); *G02B 6/4249* (2013.01); *G02B 6/4292* (2013.01)

(58) Field of Classification Search
CPC .. G02B 6/4292; G02B 6/4246; G02B 6/4214; G02B 6/423; G02B 6/4284; G02B 6/428
USPC ............................. 385/53, 88, 89, 90, 91, 92
See application file for complete search history.

(56) References Cited

U.S. PATENT DOCUMENTS

| | | | |
|---|---|---|---|
| 6,749,345 B1 * | 6/2004 | Gee et al. ........................ | 385/75 |
| 7,382,946 B2 * | 6/2008 | Oggioni et al. ................. | 385/14 |
| 2004/0184738 A1 | 9/2004 | McColloch et al. | |
| 2008/0285921 A1 | 11/2008 | Huang | |

FOREIGN PATENT DOCUMENTS

| | | |
|---|---|---|
| EP | 0330231 | 8/1989 |
| JP | 2003/004979 | 1/2003 |

* cited by examiner

*Primary Examiner* — Jennifer Doan
(74) *Attorney, Agent, or Firm* — Baker & Hostetler LLP (57) ABSTRACT

An alignment pin for an optical communication system comprises: a first portion (31) extending along a direction in a receiving hole of a printed circuit board, a second portion (32) extending along this direction in a receiving through hole of an optical coupling device, a third portion (33) extending along this direction in a receiving hole of an external optical component. The pin comprises an abutting surface (35) placed in contact with a parallel complementary surface (36) of the optical coupling device.

27 Claims, 7 Drawing Sheets

ALIGNMENT PIN AND OPTICAL COMMUNICATION SYSTEM

CROSS-REFERENCE TO RELATED APPLICATIONS

This application is the National Stage of International Application No. PCT/EP2011/068686, filed Oct. 25, 2011, which claims the benefit of International Application No. PCT/IB2010/003036, filed Oct. 26, 2010, the disclosure of which are incorporated herein by reference in their entireties.

FIELD OF THE INVENTION

The instant invention relates to alignment pins for optical communication systems, and optical communication systems.

BACKGROUND OF THE INVENTION

Most communication systems involve a number of system-cards. Such cards are usually manufactured as so-called printed circuit boards (PCBs). Because of the ever increasing requirements in data rates, due for example to the Internet, the limits of using electrical communications are being reached. It has become difficult to guarantee good signal integrity over the electrical lines.

To respond to this bandwidth demand, high speed systems are now being built with optical layers (optical fibres or planar waveguides) incorporated in replacement of the electrically-conducting metal. Indeed, light does not suffer from the same limitations as electricity.

Optical coupling devices may be used to interconnect an optical layer of a PCB, or so-called optical circuit board (OCB), with an external optical component. In order to ensure efficient transfer of light through the optical coupling device, a very precise positioning of it with respect to the circuit board is necessary, both along a vertical direction and transverse thereto. The coupling device further needs to be firmly maintained in this precise position. Further, the external optical component needs to also be precisely positioned with respect to the optical coupling device.

The instant invention has notably for object to provide such functions.

SUMMARY OF THE INVENTION

It is provided an alignment pin for an optical communication system. The alignment pin comprises a body extending between a first end and a second end. The body comprises a first portion extending along a direction in a receiving hole of the printed circuit board.

The body comprises a second portion extending along the same direction in a receiving through hole of the optical coupling device. The optical coupling device is to optically couple the printed circuit board to an external optical component.

The body comprises a third portion extending along the same direction in a receiving hole of the external optical component.

The first to third portions extend in this order from the first end to the second end.

The pin comprises an abutting surface. The abutting surface is provided intermediate between the second and third portions. It extends normal to the direction. It is to be placed in contact with a parallel complementary surface of the optical coupling device.

With these features, an alignment pin is precisely positioned with respect to the optical coupling device.

When two portions are said to extend along a given direction, it means either that they both extend along a given axis, or that they extend along two parallel axis which are offset from one another along an offset direction transverse to both axis.

In some embodiments, one might also use one or more of the following features as defined in the claims.

BRIEF DESCRIPTION OF THE DRAWINGS

Other characteristics and advantages of the invention will readily appear from the following description of fifteen of its embodiments, provided as non-limitative examples, and of the accompanying drawings.

On the drawings.

On the different Figures, the same reference signs designate like or similar elements.

DETAILED DESCRIPTION

Figure 1:
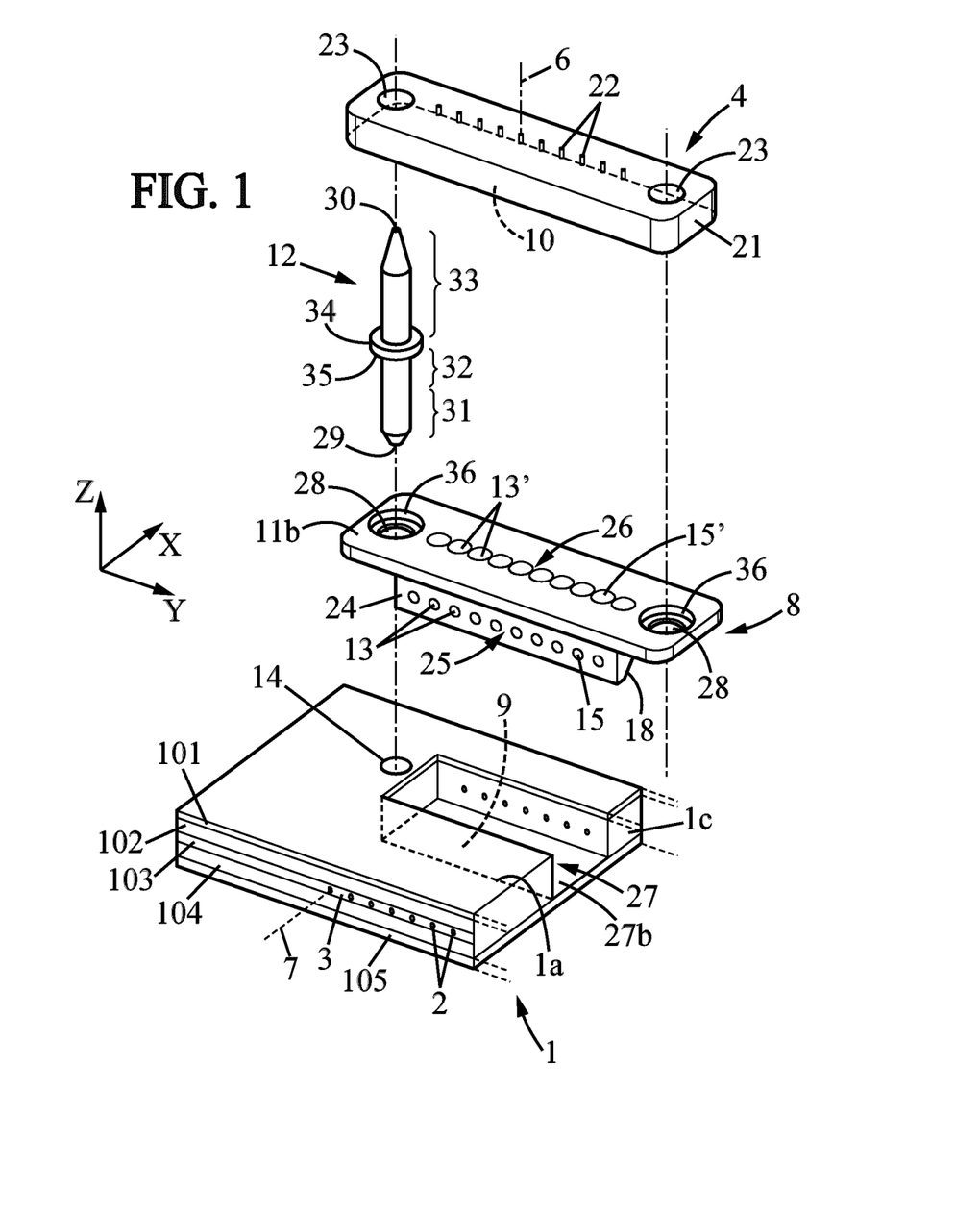
FIG. 1 is a partial perspective view of an optical communication system according to a first embodiment.

FIG. 1 partially shows a hybrid or full optical PCB 1 for example a backplane, which is a layer stack comprising a plurality of layers. In particular, this layer stack 1 may comprise, from top to bottom, a copper layer 101, a pre-preg layer 102, an optical layer 103, and further copper 104 and pre-preg 105 layers. The optical layer 103 may itself comprise a transmission optical layer embedded between a top cladding layer, and a bottom cladding layer.

The terms "top", "bottom", "up", "down" or the like are given in reference to the direction Z, normal to the top surface 1a of the PCB, and pointing toward a mating optical device 4 to be optically coupled to the PCB. The top surface of the PCB extends parallel to an X-Y plane, with X and Y being artificially defined. For example, X corresponds to the direction of propagation of light in the transmission optical layer and Y to the direction transverse thereto.

The transmission optical layer of the layer stack 1 is made of a plurality of tubes 2 integrated or embedded in a body 3 having a lower refractive index than the tubes 2. Thus, the tubes 2 and the body 3 constitute respectively the cores and the cladding of waveguides. Embedded waveguides may be polymer waveguides, glass sheet waveguides or waveguides obtained by embedded fibre technology, or the like.

A hole 14 extends in the printed circuit board along the direction Z.

It will be understood that a part of the PCB is removed from FIG. 1 to ease representation, and that what appears as a face 1c is in reality not a face but is internal to the PCB 1.

As can be seen on FIG. 1, according to a first embodiment, a cut-out 27 can be formed in the PCB 1. In particular, the cut-out 27 is shaped with a very simple form of a right parallelepiped. The cut-out is defined by straight walls. The cut-out can also have a plane bottom 27b, as shown.

The wall where the tubes 2 mouth into the cut-out defines an optical interface of the PCB. Namely, all cores 2 mouth into the cut-out 27 to define the optical interface of the PCB. This optical interface 9 comprises discrete light transmission regions arranged as an array. The spacing of transmission regions along the direction Y might be constant or not, depending on the requirements. For example, in the present drawing, the spacing between neighbour transmission regions is set constant to 250 μm.

Optical signals, transferred to or from a mating optical device 4, such as an optical device or opto-electrical device or another PCB, are provided over a first optical path 6 to/from the cores 2 of the layer stack 1, which core 2 provides a second optical path 7 for the optical signal parallel to the X-Y plane. In the present example, the optical device 4 can for example comprise a mechanical-transfer ferrule ("MT-ferrule") comprising a high precision sleeve 21 in which ends of optical fibers 22 extend in precisely defined relative locations. The mating optical device 4 thus has an optical interface 10 defined as the set of optical fibre ends directed toward the PCB. In the present drawing, this interface extends parallel to the X-Y plane.

The optical interface 10 of the mating connector has the same number of transmission regions as the optical interface 9 of the PCB. Each transmission region of the optical interface 10 of the mating optical device corresponds to a respective transmission region of the optical interface 9 of the PCB. This means that transmission regions are associated two by two and that light normally exited through the transmission region of one of the interfaces is to be transmitted to the corresponding transmission region of the other interface.

In order to precisely locate the optical device 4 with respect to the printed circuit board 1, alignment holes 23 are provided in the sleeve 21. Each hole corresponds to a corresponding hole 14 of the PCB.

In order to achieve an optimal optical coupling between the first and second optical paths, that are perpendicular to each other for the optical system here, an optical coupling device 8 is provided for alignment purposes. In the present example, the optical coupling device 8 is provided as a single unitary component, although this is not necessarily always the case.

The coupling device 8 is, for example, a unitary piece manufactured by moulding a translucent suitable material. The optical coupling device 8 comprises a first face 24 defining a first optical interface 25 which is to be put in optical coupling with the optical interface 9 of the PCB. The first optical interface 25 has transmission regions 13 which are to be placed opposite in free space (sometimes through a translucent coupling medium such as air or a suitable glue) a corresponding transmission region of the interface of the PCB. Hence, the arrangement of the first optical interface 25 directly derives from that 9 of the printed circuit board, and it will not be described in further details here.

The optical coupling device 8 comprises a second face 11b which, in the present case, extends normal to the first face, i.e. extends parallel to the X-Y plane. It defines a second optical interface 26 which is to be put in optical coupling with the optical interface of the mating optical device 4. The second optical interface 26 has transmission regions 13' which are to be placed opposite (sometimes through a translucent coupling medium such as air or a suitable glue) a corresponding transmission region of the interface of the mating optical device 4. Hence, the arrangement of the second optical interface 26 directly derives from that of the mating optical device 4, and it will not be described in further details here.

An optical path is defined between the first and second interfaces 25, 26 of the coupling device 8. Namely, diverging light entering the coupling device 8 at its first interface 25, coming from the interface of the printed circuit board 1 will be propagated through the coupling device 8 to the second interface 26 as a substantially collimated light beam, and will be focussed into the interface of the mating optical device 4. Light propagates in the opposite direction in a similar way. The light is reflected between the X and the Z direction using a mirror 18.

In particular, each transmission region of each interface of the coupling device 8 can be provided with a light beam forming structure 15, 15' such as a lens. The lenses 15 optimise the optical coupling of the optical signals of the cores 2 to/from the coupling device 8. The lenses 15' optimise the optical coupling of the optical signals of the ferrule 4 to/from the coupling device 8.

Since lenses 15 and 15' focus the optical signals at the entry of each core 2 and respectively at the entry of each optical fibre 22, the manufacture tolerance of the coupling device 8, the ferrule 4 and the layer stack 1 are increased in comparison with an optical coupling system without lenses.

As shown in the present example, the lenses 15, 15' may form an integral part of the coupling device 8. They are located at the first and second interfaces. They could be of the Fresnel-type or of the aspheric type, for example. It will be appreciated that, for each interface, all lenses of the interface could be performed identical.

In order to precisely locate the optical coupling device 8 with respect both to the printed circuit board 1 and to the mating optical device 4, alignment through holes 28 are provided in the optical coupling device 8. Each hole corresponds to both a corresponding hole of the PCB and a corresponding hole of the optical device 4.

In order to provide a proper alignment of the three devices, and in particular of their optical interfaces, an alignment pin 12 is provided which extends in the receiving hole 14 of the PCB, in the through hole 28 of the optical coupling device 8, and in the hole 23 of the optical component 4.

In particular, the alignment pin 12 has a first portion 31 which extends in the hole 14 formed in the PCB. This first portion 31 extends along the direction Z when the alignment pin 12 is in use. This first portion 31 further comprises one first end 29 of the alignment pin 12.

The alignment pin 12 further comprises a second portion 32 which extends in the alignment hole 28 of the optical coupling device 8. This second portion 32 extends along the direction Z in use of the alignment pin 12. In the present configuration, the second portion 32 is flush and directly continuous from the first portion 31.

The alignment pin 12 comprises a third portion 33 which extends in the alignment hole 23 of the mating optical device 4. The third portion 33 extends along the direction Z in use of the alignment pin. It further comprises a second end 30 of the alignment pin 12. In the present embodiment, the first 31, second 32, and third portions 33 extend along the same axis. In other words, an arbitrary line joining the ends 29 and 30 of the alignment pin 12 extends parallel to the direction Z.

The alignment pin 12 further comprises an extension 34. The extension 34 is provided between the second 32 and the third 33 portions. The extension 34 comprises an abutting surface 35 which extends in the X-Y plane.

In use, the abutting surface 35 faces a surface 36 which surrounds the through hole 28 of the optical coupling device 8. In the present example, the extension 34 is provided as a cylindrical ring, having a diameter greater than the diameter of the alignment hole 28 provided in the optical coupling device 8.

In order to manufacture an optical communication system comprising a printed circuit board 1 and an optical coupling device 8, the printed circuit board 1 is provided. Then, the optical coupling device 8 is provided, and is placed over the printed circuit board 1 so that the alignment hole 28 is aligned with the hole 14 provided in the PCB. The alignment pin 12 is then inserted from the top, so that its first portion 31 will extend in the hole 14 of the printed circuit board, and its second portion 32 will extend in the through hole 28 of the optical coupling device 8, with the abutting surface 35 resting on the complementary surface 36 of the optical coupling device 8. The various parts are fixed to one another in a suitable way, some examples of which will be described in more details below.

In order to provide optical communication of the printed circuit board 1 with the outer world, an optical mating component 4 will be plugged to the assembly of the printed circuit board 1 and optical coupling device 8, performed as explained above, by guiding the optical mating device 4 in alignment, its hole 23 receiving the third portion 33 of the alignment pin 12. The device 4 is connected, for example removably, to the printed circuit board 1 by any suitable way. It is necessary that the alignment pin 12 be sufficiently robust to withstand this connection step, but also sufficiently precisely manufactured so as to accurately define the position of the device 4 with the rest of the optical system 1 and 8. Further, the alignment pin 12 ought to be such that the step of connection does not alter the relative positioning of the printed circuit board 1 and optical coupling device 8 (for example by inducing permanent deformation of the optical coupling device 8).

Even though the above has been described in relation to one alignment pin 12, the same steps are simultaneously performed for a plurality of alignment pins 12 such as, in the case of the embodiment of FIG. 1, two alignment pins, or more.

A second embodiment will now be discussed in relation to FIG. 2. The embodiment of FIG. 2 mainly differs from the one of FIG. 1 in that the optical coupling device 8 does not comprise a mirror 18. According to the second embodiment, the mirror used for making the light to be reflected from the PCB plane to the mating device 4 is provided inside the printed circuit board 1, for example by etching. In such case, the optical coupling device 8 can comprise two parallel interfaces 25 and 26.

Figure 2:
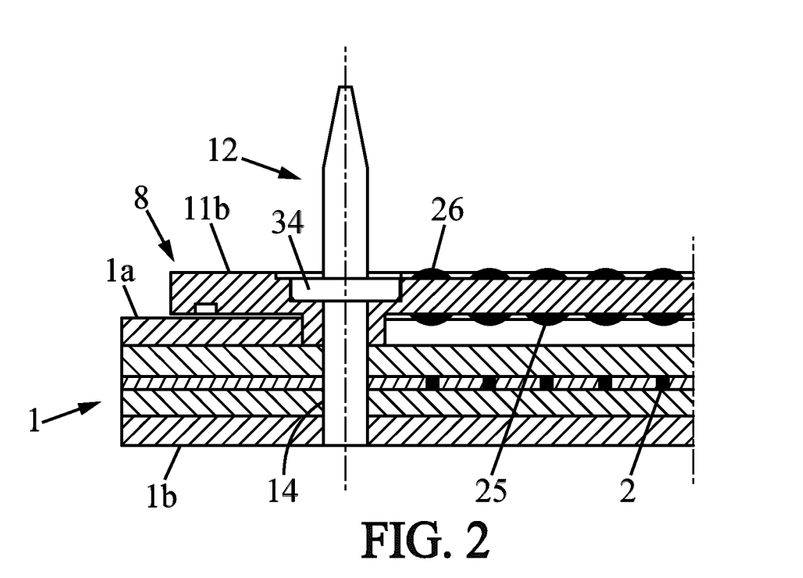
FIG. 2 is a partial sectional view of an optical communication system according to a second embodiment.

As can be seen more precisely on FIG. 2, the surface 11b of the optical coupling device 8 can be provided with a recess so as to accommodate the extension 34 of the alignment pin 12. By doing so, the extension 34 will not protrude over the top face 11b of the optical coupling device 8, and will not form a bulge which may prevent the connection of the mating optical device 4. This feature is also present in the embodiment of FIG. 1.

As can be seen on FIG. 2, the hole 14 provided in the PCB can be a through hole extending between the top face 1a and an opposed bottom face 1b of the printed circuit board. However, this is not compulsory within the frame of the invention. Similarly, the hole 23, in the mating optical device 4, which is shown on FIG. 1 as being a through hole, is not necessarily a through hole.

The extension 34 can be provided integral with the body of the alignment pin 12, being for example a whole unitary moulded body.

Figure 3:
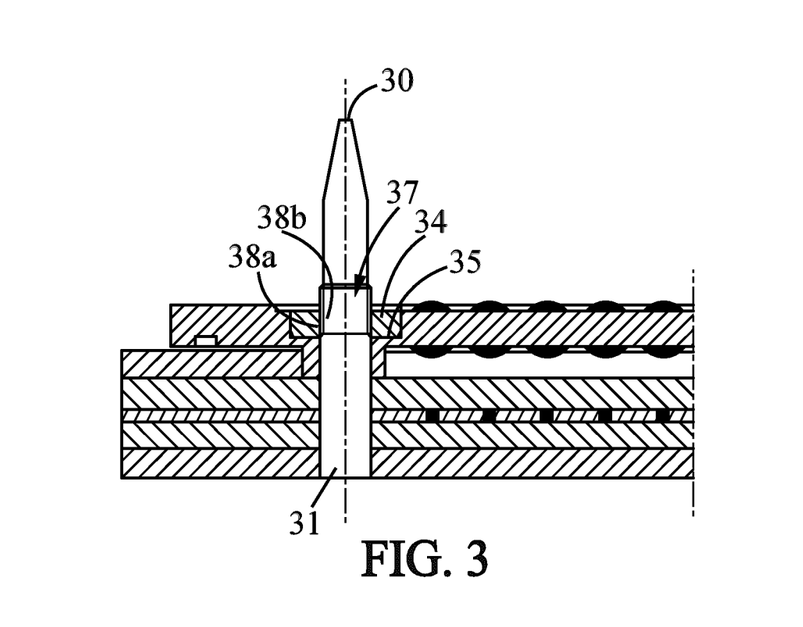
FIG. 3 is an enlarged view of FIG. 2 for a third embodiment.

According to a variant embodiment, as shown on FIG. 3, the alignment pin 12 can be provided as an assembly of a body 37 and a separate extension 34. The body 37 will for example be an elongated cylinder comprising the first, second and third portions 31, 32, 33. According to this embodiment, the extension 34 can be fixed to the body 37 by any suitable way. According to one embodiment, the body 37 and the extension 34 will comprise complementary threads 38a, 38b, so that the extension 34 can be screwed on the body 37 from its second end 30. For example, in the present embodiment, the first portion 31 of the alignment pin 12 will not be threaded. It is thus possible to provide the extension 34, and in particular the abutting surface 35, as having a position which is adjustable with respect to the second end 30 of the body along the direction Z.

Figure 4:
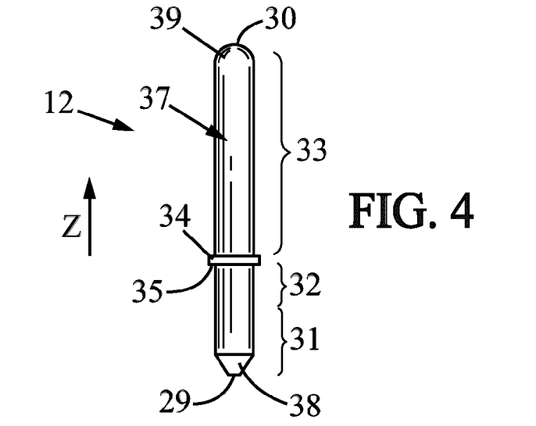
FIG. 4 is a front view of an alignment pin.
Figures 5, 6:
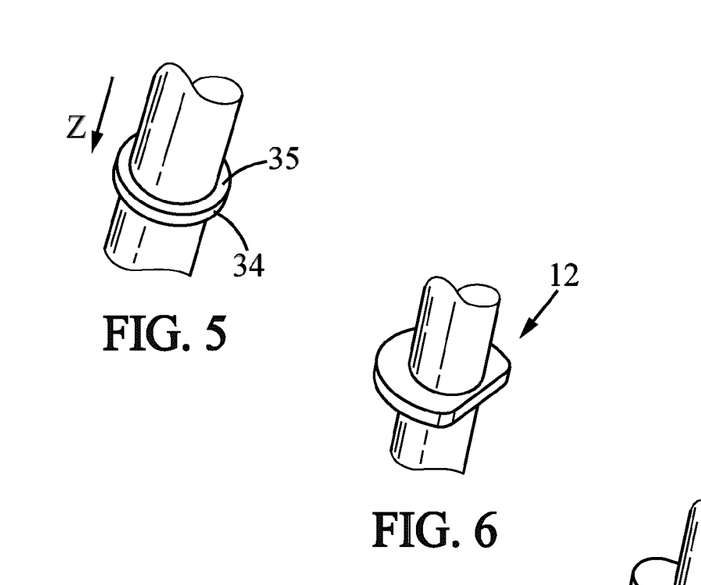
FIG. 5 is an enlarged partial perspective view of the embodiment of FIG. 4.
FIGS. 6 and 7 are views similar to FIG. 5 for a fourth and a fifth embodiment, respectively.

An alignment pin 12 suitable for the above embodiments is shown in more details on FIGS. 4 and 5. In particular, the first portion 31 can be provided with a truncated end portion 38 bearing the first end 29, so as to ease the introduction of the alignment pin 12 in the PCB 1. Similarly, the third portion 33 can be provided with a truncated end portion 39 bearing the second end 30, so as to ease the insertion of the optical mating device 4 on the alignment pin 12.

According to this embodiment, the extension 34 is provided as a continuous cylinder ring.

According to a fourth embodiment as shown on FIG. 6, this ring can be truncated where space is needed. For example, the area of the extension 34 closest to the optical paths provided in the optical coupling device can be truncated.

Figure 7:
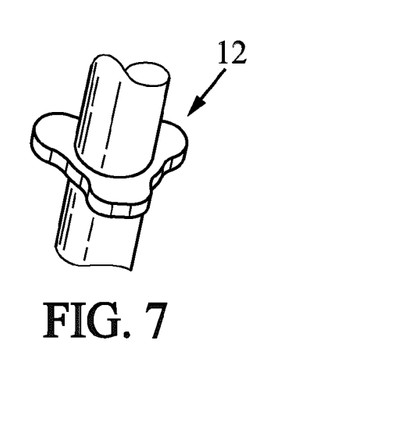

According to a fifth embodiment, as shown on FIG. 7, the extension 34 can have any suitable shape, such as a star shape, a flower shape, or the like.

Embodiments for the fixation of the alignment pin 12 will now be described in relation to FIG. 8 and following. According to a sixth embodiment, as shown on FIG. 8, the alignment pin 12 is further provided with a second extension 39. This extension extends in the first portion 31 of the alignment pin 12, and in particular at its first end 29. The second extension 39 comprises a second abutting surface 40 which extends parallel to the X-Y plane facing the first abutting surface 35 of the extension 34. The second abutting surface 40 abuts on a corresponding abutting surface 41 of the printed circuit board. Hence, both the optical coupling device 8 and the printed circuit board 1 are clamped between the abutting surfaces 34 and 40 of the alignment pin 12.

Figure 8:
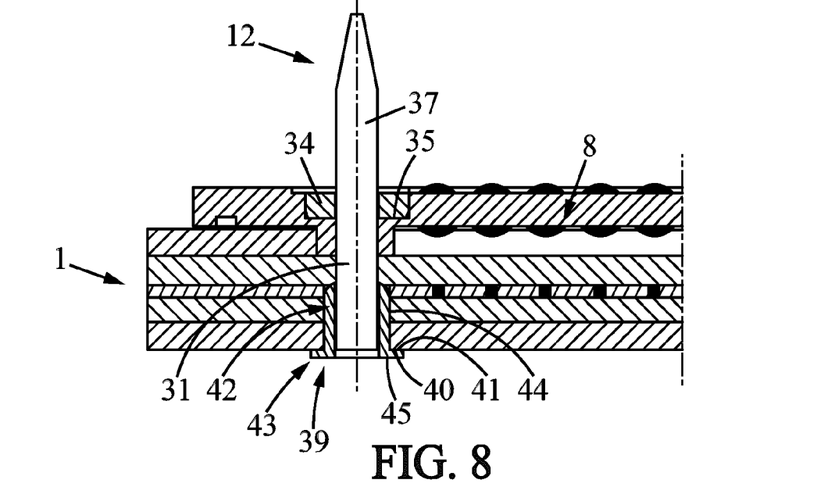
FIG. 8 is a view similar to FIG. 2 for a sixth embodiment.

According to the embodiment of FIG. 8, which is purely illustrative, a fixation part 42 is provided as a sleeve 43 which has a body 44 which is cylindrical and is introduced from the bottom in the hole 14 of the PCB. The body 44 has an internal hole which can receive the first portion 31 of the body 37 of the alignment pin 12. The sleeve 43 further comprises a collar 45 which forms the extension 39 and comprises the abutting surface 40. In the present embodiment, the sleeve 43 is provided as a separate part from the body 37. The body 37 is fixed to the sleeve 43 in any suitable way. For example, the first portion 31 of the body 37 is threaded, and so is the internal surface of the body 44 of the sleeve 43. The sleeve 43 can be press fitted into the hole 14 of the PCB until the abutting surfaces 40 and 41 come in contact, from below the PCB. The body 37 of the alignment pin 12 can then be introduced from the top, by threading the first portion 31 into the sleeve 43 until the abutting surface 35 abuts on the surface 36 of the optical coupling device 8. This is for example the case when the extension 34 is integral with the body 37. In another not shown embodiment, after screwing the body 37 into the sleeve 43, the extension 34 can be screwed from the top to the body 37, as discussed above in relation to FIG. 3. It is thus possible to fix the alignment pin 12 to the printed circuit board 1 without using glue, which enables to take away the disadvantages of glue when glue is undesirable in this type of optical communication systems.

Figure 9:
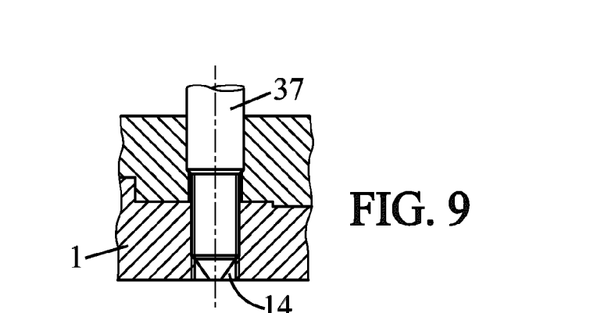
FIG. 9 is an enlarged partial sectional view for a seventh embodiment.

As shown on FIG. 9, according to a seventh embodiment, there are alternative ways of fixing the alignment pin 12 to the printed circuit board 1. In particular, the hole 14 of the printed circuit board can itself have a thread, thereby enabling to screw the body 37 directly in the printed circuit board 1 without using a sleeve 43.

Figure 10:
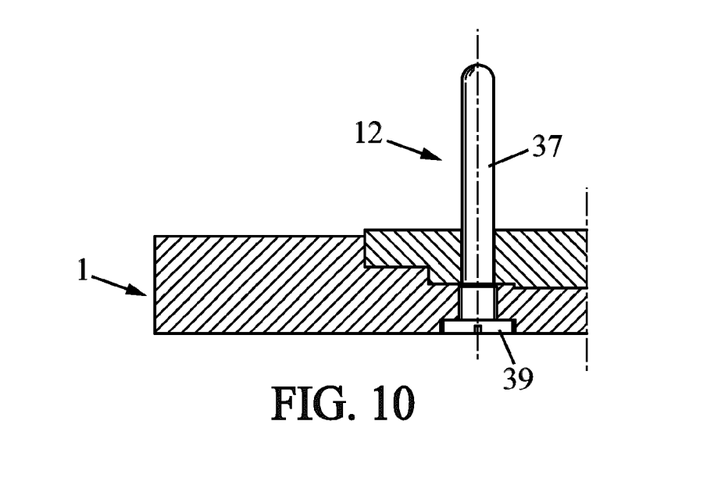
FIG. 10 is a view similar to FIG. 9 for a eighth embodiment.

FIG. 10 now shows an eighth embodiment. According to this embodiment, the extension 34 is a separate part, which is not shown on FIG. 10, and will be assembled to the body 37 in a later step. According to this embodiment, the alignment pin 12 is inserted from the bottom of the printed circuit board and comprises an integrated second extension 39. Further, as a fixation part 42, a thread is provided in the first portion 31 of the alignment pin 12 so as to screw the alignment pin 12 from the bottom into the complementary thread of the printed circuit board 1 until the abutting surfaces 40 and 41 come into contact. The extension 34 can then be slid in the body 37 from the top and placed in position, for example by screwing.

Figures 11, 12:
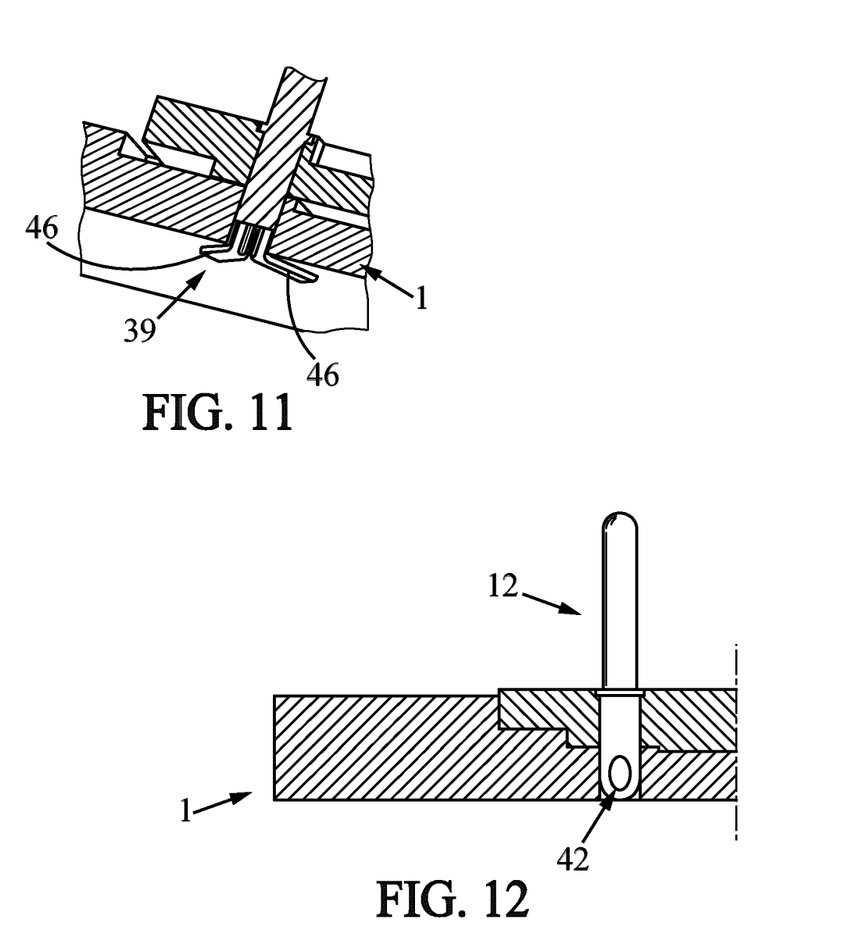
FIG. 11 is a bottom perspective partial sectional view for a ninth embodiment.
FIG. 12 is a view similar to FIG. 10 for a tenth embodiment.

According to a ninth embodiment, as shown on FIG. 11, the second extension 39 can be provided as one or more legs 46. For example, according to this embodiment, these legs 46 can be deformed so as to provide the second extension 39. For example, the alignment pin 12 can be introduced from the top, with the legs 46 being undeformed, passing through the hole 14 of the printed circuit board. Then, deformation for example by crimping, will fold the legs 46 so that their abutting surface will come into contact with the complementary abutting surface of the printed circuit board 1.

Figure 13:
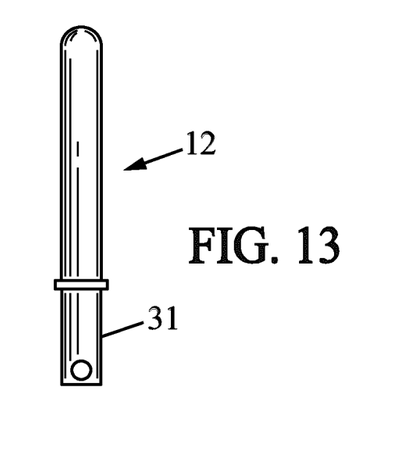
FIG. 13 is a view similar to FIG. 4 for an eleventh embodiment.

Yet, other embodiments are shown on FIGS. 12 and 13, for the fixation of the alignment pin 12 to the printed circuit board 1. For example, as shown on FIG. 12 for a tenth embodiment, the alignment pin 12 can be provided with a fixation part 42 which is a press fit. According to an eleventh embodiment shown on FIG. 13, the alignment pin can be provided with a through hole in its first portion 31, so as to pin the alignment pin 12 in fixation to the PCB 1.

The above described embodiments show an alignment pin which has a simple body elongated along a single direction, whereby the first, second and third portions, 31, 32, 33 are aligned. However, other shapes are possible for the alignment pin 12 as will be discussed below in relation to FIGS. 14 to 17. These shapes can be provided with an abutment surface 35 and/or a fixation to the PCB as discussed with any of the above embodiments, where applicable.

Figure 14:
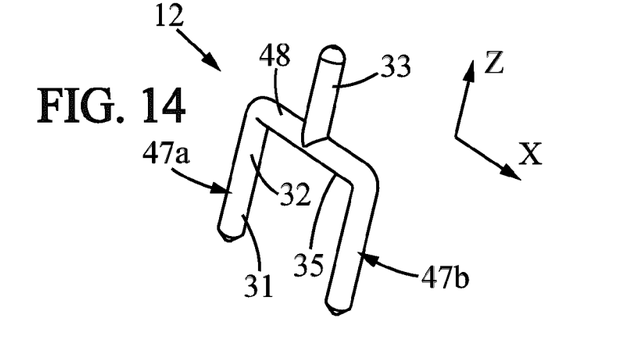
FIG. 14 is a perspective view of an alignment pin according to a twelfth embodiment.

Turning in particular to the twelfth embodiment, as shown on FIG. 14, the alignment pin 12 is provided with a third portion 33 as discussed above, for insertion into the hole 23 of the mating optical device 4. According to this embodiment, the alignment pin 12 has two bottom portions 47a, 47b which are identical to one another, and offset with respect to one another along a transverse direction located in the X-Y plane. For example, this transverse direction is the X direction. The two bottom portions 47a, 47b are linked together, and linked to the third portion 33 through a linking portion 48. For example, along the transverse direction X, the third portion 33 extends between the two bottom portions 47a and 47b. The bottom portion 47a comprises a first portion and a second portion 31, 32 which are provided similar to the first and second portions 31, 32 of the alignment pin 12 of the above embodiments (in particular of the first embodiment). This also applies to the other bottom portion 47b. The linking portion 48 thus bears the abutting surface 35 which will abut on a complementary surface of the optical coupling device 8. If the linking portion 48 is sensibly cylindrical, as shown, the abutting surface 35 may be rather linear, compared to the surfacic surfaces of the above embodiments. A surface is said to be "linear" when one of its dimension is much greater than another one of its dimension.

In use, the alignment pin 12 of the embodiment of FIG. 14 will have its bottom portion 47a introduced in corresponding holes 14 and 28 of the PCB and of the optical coupling device 8, and its bottom portion 47b introduced in other holes 14, 28 of the these devices. The abutting surface 35 will abut on a corresponding surface of the optical coupling device. Fixation and assembly to the optical mating device 4 can be performed according to any suitable embodiment.

Figure 15:
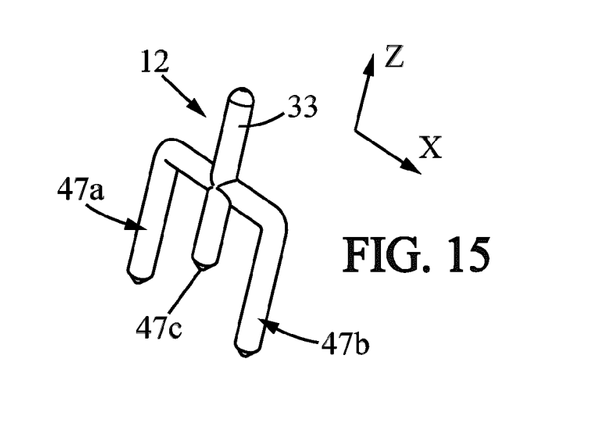
FIGS. 15 and 16 are views similar to FIG. 14 for a thirteenth, fourteenth embodiment, respectively.

According to a thirteenth embodiment, as shown on FIG. 15, it is provided an alignment pin 12 which is similar to the one which has been described above in relation to FIG. 14, however having a third bottom portion 47c. For example, the third bottom portion 47c extends between the two bottom portions 47a and 47b, and continuously with the first portion 33. Hence, it requires three holes in the PCB and three holes in the optical coupling device 8 to use an alignment pin 12 as shown on FIG. 15.

Figure 16:
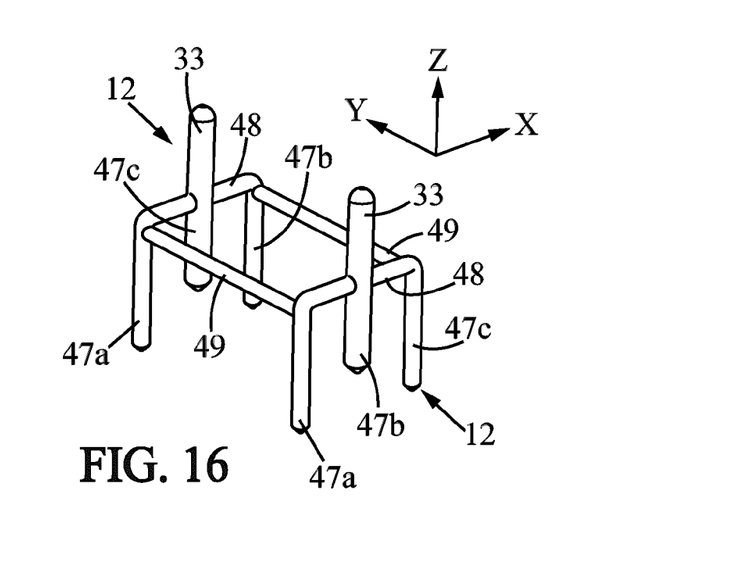

According to a fourteenth embodiment, as shown on FIG. 16, an alignment system is provided which comprises two parallel alignment pins 12 as discussed in relation to FIG. 15, which are provided in parallel, and offset with respect to an other transverse direction in the X-Y plane. A linking portion 49 is provided along this other transverse direction such as two arms extending along the Y direction between the two alignment pins 12. It can be considered that the linking portions 48 and 49 build a frame which carries the bottom portions 47a, 47b, 47c and third portions 33. Thus, six holes are provided in the PCB and six holes in the optical coupling device 8, so as to place the alignment system of FIG. 16. The abutting surface 35 can be provided on the linking portion 48, as discussed above in relation to FIGS. 14 and 15, and/or on the linking portion 49 as desired.

Figure 17:
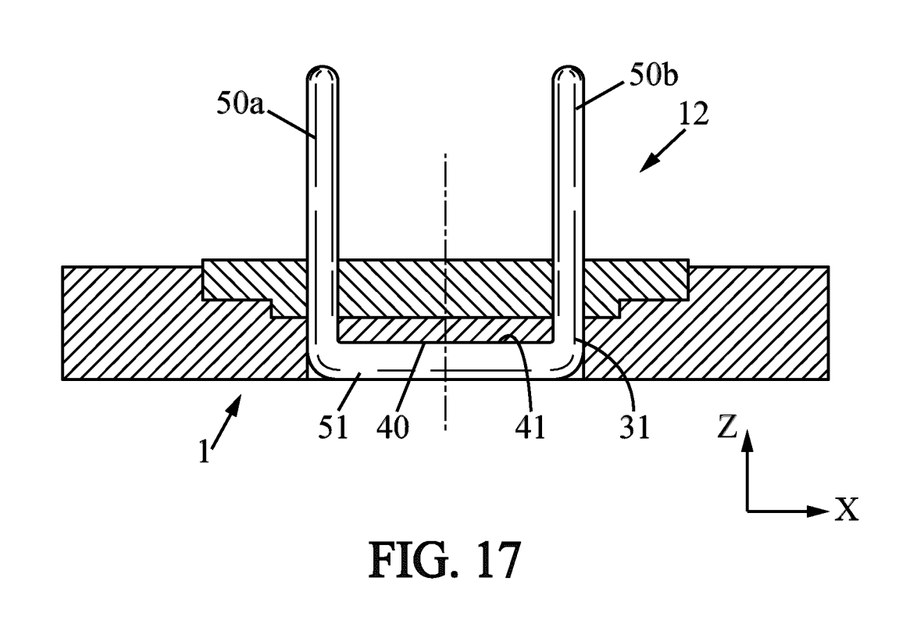
FIG. 17 is a sectional view of a fifteenth embodiment.

As shown on FIG. 17, according to a fifteenth embodiment, the alignment pin 12 is provided having two portions 50a, 50b, which each sensibly correspond to an alignment pin according to the above embodiments, of FIGS. 1 to 13 when appropriate. These two portions 50a and 50b are linked together by a linking portion 51 which extends along a transverse direction, for example direction X. Contrarily to the embodiment of FIG. 14, the linking portion 51 is provided to link together the two first portions 31 of the portions 50a and 50b of the alignment pin 12 of this embodiment. Thus, the alignment pin 12 of FIG. 17 is U shaped. The linking portion 51 may comprise the abutting surface 40 which will abut on a complementary abutting surface 41 of the printed circuit board 1. Hence, the alignment pin 12 of FIG. 17 is introduced from the bottom into the printed circuit board 1. The extension 34 can be provided as an external part which is assembled from the top to any of the portions 50a, 50b, as discussed above in relation to FIG. 3.

The invention claimed is:
1. An alignment pin for an optical communication system, comprising:

a body extending between a first end and a second end, said body including, from the first end to the second end;
a first portion adapted to extend along a direction in a receiving hole of a printed circuit board;
a second portion adapted to extend along said direction in a receiving through hole of an optical coupling device adapted to optically couple the printed circuit board to an external optical component;
a third portion adapted to extend along said direction in a receiving hole of an external optical component; and
an abutting surface disposed intermediate between the second and third portions, the abutting surface extending normal to said direction, and adapted to be placed in contact with a parallel complementary surface of the optical coupling device.

2. The alignment pin according to claim 1, further comprising at the first portion, a second abutting surface extending normal to said direction, and adapted to be placed in contact with a parallel complementary surface of the printed circuit board.

3. The alignment pin according to claim 1, comprising at least one extension protruding from said body, wherein the extension bears a respective abutting surface.

4. The alignment pin according to claim 3, wherein one extension is integral with the body.

5. The alignment pin according to claim 3, wherein at least one extension is a separate part fixed to the body.

6. The alignment pin according to claim 5, wherein a position of the extension along the direction with respect to the second end is adjustable.

7. The alignment pin according to claim 1, further comprising at the first portion, a fixation portion adapted to contribute to a fixation of the alignment pin to the printed circuit board.

8. An alignment pin for an optical communication system, comprising:
a body extending between a first end and a second end, said body including, from the first end to the second end:
a first portion adapted to extend along a direction in a receiving hole of a printed circuit board;
a second portion adapted to extend along said direction in a receiving through hole of an optical coupling device adapted to optically couple the printed circuit board to an external optical component; and
a third portion adapted to extend along said direction in a receiving hole of an external optical component;
an abutting surface disposed intermediate between the second and third portions, the abutting surface extending normal to said direction, and adapted to be placed in contact with a parallel complementary surface of the optical coupling device; and
a fixation portion disposed at the first portion, the fixation portion adapted to contribute to a fixation of the alignment pin to the printed circuit board.

9. The alignment pin according to claim 8, wherein the fixation portion is a thread.

10. The alignment pin according to claim 9, further comprising a sleeve adapted to be screwed on the thread from the first end.

11. The alignment pin according to claim 8, wherein said body is elongated from said first end to said second end along said direction.

12. The alignment pin according to claim 8, wherein at least two of said first, second and third portions are offset with respect to one another along a transverse direction transverse to said direction.

13. The alignment pin according to claim 12, wherein said second and third portions are offset with respect to one another along said transverse direction, and a linking part extends between said second and third portions are bears said abutting surface.

14. The alignment system comprising two alignment pins according to claim 8, offset with respect to one another along a transverse direction, and a linking part extending between said two alignment pins, wherein said linking part has a second abutting surface extending normal to said direction, and adapted to be placed in contact with a parallel complementary surface of the printed circuit board.

15. An optical communication system comprising:
a printed circuit board having a hole;
an optical coupling device adapted to optically couple the printed circuit board to an external optical component, said optical coupling device having a through hole and a surface; and
an alignment pin according to claim 1, wherein the first portion extends in said receiving hole of the printed circuit board, the second portion extends in said through hole of the optical coupling device, the abutting surface is placed in contact with said surface of the optical coupling device.

16. An optical communication system comprising:
a printed circuit board having a hole;
an optical coupling device adapted to optically couple the printed circuit board to an external optical component, said optical coupling device having a through hole and a surface; and
an alignment pin including:
a body extending between a first end and a second end, said body including, from the first end to the second end:
a first portion extending along a direction in said receiving hole of the printed circuit board;
a second portion extending along said direction in said receiving through hole of the optical coupling device;
a third portion adapted to extend along said direction in a receiving hole of said external optical component;
an abutting surface intermediate between the second and third portions, the abutting surface extending normal to said direction, and placed in contact with said surface of the optical coupling device; and
a fixation portion disposed at the first portion, the fixation portion adapted to fix the pin to the printed circuit board.

17. The optical communication system according to claim 15, wherein the hole in the printed circuit board is threaded.

18. The optical communication system according to claim 16, wherein the hole in the printed circuit board is threaded.

19. The alignment pin according to claim 1, wherein said body is elongated from said first end to said second end along said direction.

20. The alignment pin according to claim 1, wherein at least two of said first, second and third portions are offset with respect to one another along a transverse direction transverse to said direction.

21. The alignment pin according to claim 20, wherein said second and third portions are offset with respect to one another along said transverse direction, and a linking part extends between said second and third portions are bears said abutting surface.

22. The alignment system comprising two alignment pins according to claim 1, offset with respect to one another along a transverse direction, and a linking part extending between said two alignment pins, wherein said linking part has a second abutting surface extending normal to said direction, and adapted to be placed in contact with a parallel complementary surface of the printed circuit board.

23. The alignment pin according to claim 7, wherein the fixation portion is a thread.

24. The alignment pin according to claim 23, further comprising a sleeve adapted to be screwed on the thread from the first end.

25. The optical communication system of claim 15, wherein the alignment pin further comprises at the first portion, a second abutting surface extending normal to said direction, and the second abutting surface is placed in contact with a parallel complementary surface of the printed circuit board.

26. The optical communication system of claim 15, wherein the alignment pin comprises at least one extension protruding from said body, wherein the extension bears a respective abutting surface.

27. The optical communication system of claim 26, wherein the at least one extension is integral with the body.

* * * * *

UNITED STATES PATENT AND TRADEMARK OFFICE
CERTIFICATE OF CORRECTION

| | | |
|---|---|---|
| PATENT NO. | : 9,052,480 B2 | Page 1 of 1 |
| APPLICATION NO. | : 13/881527 | |
| DATED | : June 9, 2015 | |
| INVENTOR(S) | : Gnitaboure Yabre et al. | |

It is certified that error appears in the above-identified patent and that said Letters Patent is hereby corrected as shown below:

In the claims

COL. 10, Line 4 (Claim 13), delete "are bears" and substitute therefor – and bears –

COL. 10, line 62 (Claim 21), delete "are bears" and substitute therefor – and bears –

Signed and Sealed this
Thirteenth Day of October, 2015

Michelle K. Lee
*Director of the United States Patent and Trademark Office*